May 17, 1932.　　　A. J. HALL　　　1,859,035
COMPARATOR
Filed Dec. 19, 1929　　2 Sheets-Sheet 1
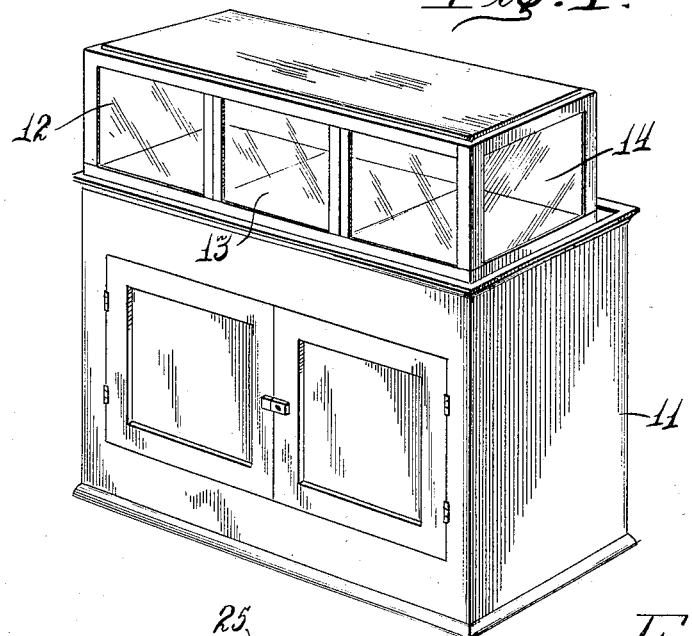
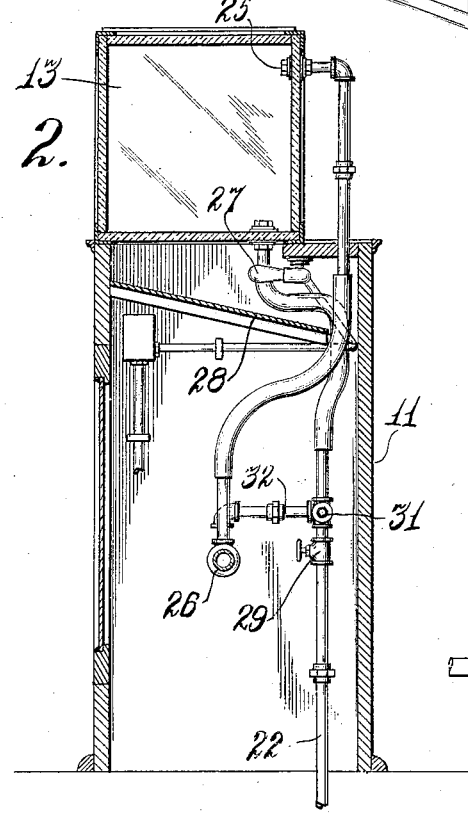
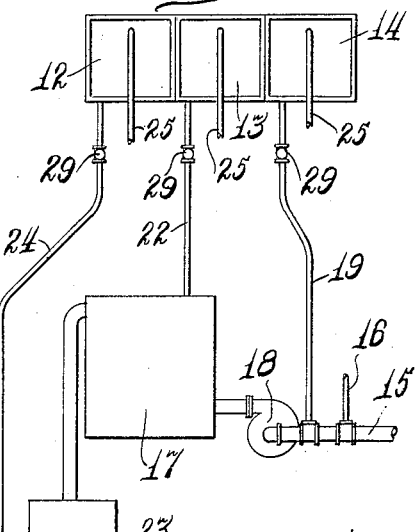

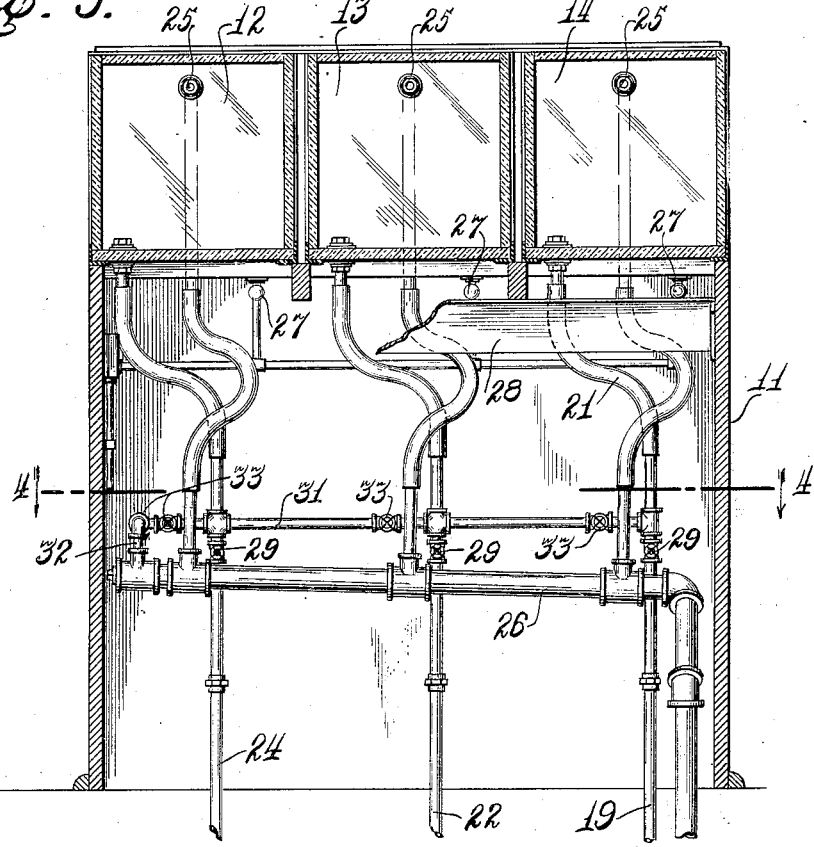
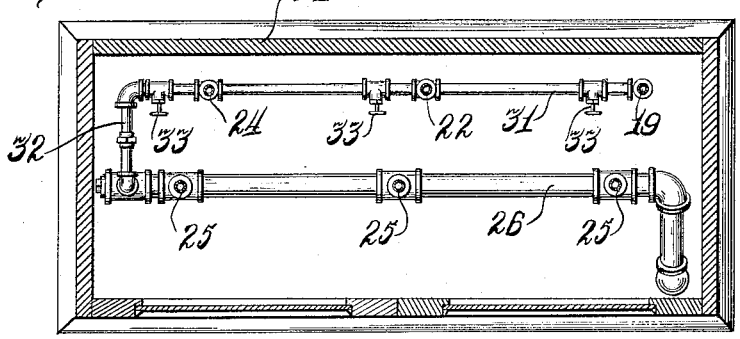

Patented May 17, 1932

1,859,035

UNITED STATES PATENT OFFICE

ARTHUR J. HALL, OF APPLETON, WISCONSIN

COMPARATOR

Application filed December 19, 1929. Serial No. 415,244.

The invention relates to comparators and particularly to a device for displaying water before and after it passes through the various stages of purification.

It is an object of the invention to provide a device of the character referred to for effecting a display of the water being purified as it passes through each of the various stages of filtration to enable the operator to ascertain at a glance, the functioning of the water purification plant.

Another object of the invention is to provide an improved comparator of the character referred to for indicating to the operator the percentage of floc or precipitate which has been removed after the addition of a coagulant.

Another object of the invention is to provide an improved comparator of the character referred to having means for disclosing any inconsistencies in the filtering process, thereby effecting a material reduction in the operating cost and increased operating efficiency.

Another object of the invention is to provide an improved comparator which may be inexpensively incorporated in a water filtering system without interfering with the functions of, or requiring extensive changes in, said system.

The foregoing and such other objects of the invention as will appear hereinafter as the description proceeds, will be more readily understood from a perusal of the following specification, reference being had to the accompanying drawings, in which:

Fig. 1 is a perspective view of the improved comparator.

Fig. 2 is a transverse vertical sectional view through the comparator.

Fig. 3 is a longitudinal sectional view through the device.

Fig. 4 is a horizontal sectional view taken substantially on line 4—4 of Fig. 3.

Fig. 5 is a diagrammatic view showing the piping connecting the comparator with a filtering system.

There are three distinct stages through which water must pass in the process of purification; namely, the stage in which a coagulant is added to the raw water to aid the formation of floc; the water settling stage, and finally the filtering stage. Since the health and general welfare of the community is dependent upon its water supply, the successful operation of a water purification plant is very essential. As wind conditions, rain fall, and other unavoidable causes change the character of the raw water, it is very important that the operator can at all times ascertain the character of the water after it has passed through any or all of the various stages.

The improved comparator is adapted to be connected with the purification system in such a manner that a portion of the raw water entering the system is made visible to the operator so that he can immediately note any character change that may have taken place. The raw water inlet line is preferably tapped just beyond the point where the coagulant is injected into the system, thus enabling the operator to see the state of coagulation and make certain that coagulation always takes place. After the water has passed through the settling chamber in the filtering system, a quantity of it is made visible to the operator to show him the settling efficiency of the settling basin and to enable him to see at a glance whether the floc or precipitate, and color has been removed. Another tap is made near the outlet of the filtering system to enable the operator to note the condition of the water as it passes into the mains.

Referring in detail to the various figures in the drawings, a substantially rectangular cabinet 11 is provided upon which is suitably mounted three transparent compartments 12, 13, and 14. Water in its various stages is admitted to each of these compartments during the filtration process, the compartment 12 being adapted to contain filtered water; compartment 13, settled water; and compartment 14, the raw water.

Raw water is supplied to the filtering system through a suitable inlet line 15. The usual coagulant is injected in regulated quantities into the raw water inlet line 15 through conduit 16 and the water, thus prepared, is pumped into a settling tank 17 by any suitable pump 18. The inlet line 15 leading to pump 18 is preferably tapped to receive an influent line 19 having a flexible connection 21 with compartment 14 whereby a small quantity of the prepared water is supplied thereto. The settling tank 17 is similarly connected by influent line 22, with the settled water compartment 13. After the water has passed through the filter tank 23 a small quantity of it is directed to the filtered water compartment 12 through influent line 24. Compartments 12, 13, and 14 are each provided with a suitable outlet 25 adjacent their upper ends, each having connection with a header 26 preferably arranged in the cabinet 11.

It will be noted that some of the prepared raw water entering the filtering system passes into compartment 14 and out again through the drain 25 in a continuous stream. As the walls of the various compartments are preferably formed of plate glass, a continuous picture of the character of the treated raw water passes before the operator, whereby he may note the reaction, if any, taking place between the added coagulant and the raw water, and note the size of floc or precipitate that has formed. By viewing compartment 13, through which a steady flow of settled water is maintained, the operator can note how much of the floc or precipitate has been removed by the process of sedimentation. For the proper filtration of water the settled water should retain a small percentage of the floc, to aid the removal of fine particles left in the water after sedimentation, and to assist in removing any remaining bacteria. By passing the filtered water through compartment 12 the operator can ascertain whether the water is free from color and precipitate, which indicates whether or not the plant is functioning properly. Any inefficiency in the several processes of filtration is immediately exposed in the improved comparator.

To add visibility to the water in the various compartments, it is desirable to arrange a plurality of lamps 27 beneath the compartments. In the drawings one such lamp is shown beneath each compartment and a white vitrolite plate 28 is angularly arranged in the cabinet 11 beneath said lights for directing the light rays upwardly through the water.

To provide for the cleansing of compartments 12, 13, and 14, a suitable valve 29 is provided in each of the influent lines 19, 22, and 24, which, when closed, cut off the flow of water to the respective compartments. A header 31 having connection, by pipe 32, with header 26, connects lines 19, 22, and 24, above valves 29. The header 31 is also provided with suitable valves 33 whereby drainage of water from the tanks is effected while said valves are open and valves 29 closed. During the operation of the comparator the valves 33 are closed and valves 29 are open.

From the foregoing description it can readily be understood that the improved comparator provides means whereby a sample specimen of the prepared raw water, settled water, and filtered water, may be viewed or obtained at any time during the operation of the filtering system. Water that has not been properly treated, as for example, if not enough coagulant has been added, will not show any reaction in compartment 14 thereby indicating to the operator that more coagulant must be added. If too much coagulant has been added, the water, passing through compartment 14, shows a large and heavy precipitate, thus indicating the necessity of reducing the amount of coagulant. Comparison of the water in the settling compartment 13 and raw water compartment 14 enables the operator to ascertain the efficiency of the various stages of filtration.

The comparator may be arranged at any suitable location in the filtering system, but it is preferable that it be situated where most convenient to the operator and where it can be viewed by visitors to the plant as well. As the operator has a full understanding of the functioning of the filtering system he can readily remedy any case of inefficiency as effected by changing water conditions, thus the operating costs of the filtering plant can be reduced to a minimum.

Although an exemplary form of the improved comparator is shown in detail in the accompanying drawings and described in the foregoing specification, it is readily understood that the comparator is capable of embodying various modifications in detail structure without departing from the spirit of the invention or the scope of the appended claims.

I claim:

1. A comparator for a filtering system, comprising, a cabinet, a plurality of transparent compartments arranged above said cabinet; an influent line connecting each of said compartments with a different part of said filtering system; each of said compartments having an outlet whereby a continuous flow of water therethrough is maintained; a plurality of lights arranged in said cabinet below said compartments; and a light deflector angularly arranged in said cabinet for directing the light rays upwardly rearwardly through said compartments to increase the visibility through the water passing through said compartments.

2. An apparatus of the character described comprising, in combination, a cabinet, a plurality of transparent sealed compartments mounted on said cabinet, each compartment being connected by flexible influent lines with different parts of a filtering system, an outlet in the rear wall of each compartment connected with a drain header whereby continuous circulation is had in each compartment, by-passes inter-connecting said influent lines with said drain header, valves in said influent lines and said by-passes operable to stop the flow into said compartments and drain said compartments, and illuminating means including a plurality of incandescent lamps and a rearwardly inclined reflector arranged directly below said compartments to direct a diffused light upwardly rearwardly through said compartments.

In testimony whereof I affix my signature at Appleton, Wisconsin.

ARTHUR J. HALL.